(12) United States Patent
Jensen

(10) Patent No.: US 11,692,476 B1
(45) Date of Patent: Jul. 4, 2023

(54) COMBINED DEAERATOR AND PUMP END WALL FOR A COOLANT SYSTEM OF A VEHICLE

(71) Applicant: Cooper-Standard Automotive Inc., Northville, MI (US)

(72) Inventor: Jacob C. Jensen, Farmington Hills, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 0 days.

(21) Appl. No.: 17/939,928

(22) Filed: Sep. 7, 2022

(51) Int. Cl.
*F01P 11/02* (2006.01)
*F01P 3/20* (2006.01)
*F01P 5/10* (2006.01)

(52) U.S. Cl.
CPC ............... *F01P 11/028* (2013.01); *F01P 3/20* (2013.01); *F01P 5/10* (2013.01); *F01P 11/029* (2013.01)

(58) Field of Classification Search
CPC .... F01P 11/028; F01P 3/20; F01P 5/10; F01P 11/029; F01P 11/02
See application file for complete search history.

(56) References Cited

U.S. PATENT DOCUMENTS 6,581,579 B1 * 6/2003 Knight .................. F02M 37/20
123/541
2022/0018278 A1 * 1/2022 Petschenyk .......... F01P 11/0285

* cited by examiner

*Primary Examiner* — Jacob M Amick
(74) *Attorney, Agent, or Firm* — Paschall & Associates, LLC; James C. Paschall

(57) ABSTRACT

This disclosure pertains to a device for removing air from a coolant liquid of a coolant system. The device has a body, a swirl pot having a first fluid outlet, and a pump end wall formed with the body and connected to the first fluid outlet. The pump end wall provides a second fluid outlet.

20 Claims, 4 Drawing Sheets

COMBINED DEAERATOR AND PUMP END WALL FOR A COOLANT SYSTEM OF A VEHICLE

TECHNICAL FIELD

This disclosure is generally directed to a device for removing air from a coolant fluid in a coolant system. More specifically, it relates to a deaerator and pump end wall in a body for removing air from a coolant liquid in a coolant system for a vehicle.

BACKGROUND

Coolant systems for internal combustion engines use a coolant pump to drive a flow of a coolant liquid in contact with a heat generating component to remove heat and then to a heat exchanger such as a radiator. The radiator cools the liquid, and the cooled liquid is returned to the heat generating component in a continuous cycle. Air bubbles are generated in the coolant liquid as a result of fluid being vaporized by the heat generating component and by high pressure combustion gasses escaping from the engine combustion chamber. These bubbles cause thermal stress to coolant pipes of the heat exchanger resulting in a decrease in heat exchange performance. Thus, it is imperative to remove these bubbles from the coolant system.

Air bubble removal devices such as swirl pots have been developed to remove air bubbles from coolant liquid. A swirl pot is placed in the fluid circulation system and has a fluid input connected to the heat generating component, a fluid outlet connected to the heat exchanger, and a bubble outlet connected by a tube or pipe to a degas bottle mounted above the swirl pot. The swirl pot has a generally curved wall defining a chamber and has a cross-sectional area greater than the fluid outlet. The swirl pot is dimensioned such that the incoming fluid dwells within the chamber for a sufficient period for the air bubbles to leave the coolant liquid and exit through the bubble outlet. Thus, deaerated coolant fluid is supplied to the heat exchanger.

The piping system in a coolant system can become quite complicated with numerous heat-generating components connected to the swirl pot. It is common to have numerous connections and connecting points located throughout the system which makes servicing the system complex and difficult to maintain. Thus, there is a need for a deaerator device that simplifies the piping in a coolant system.

SUMMARY

This disclosure relates to a combined deaerator and a pump end wall within a body for use in a coolant system with a heat generating component and a heat exchanger. The disclosure further relates to a device for removing air from a coolant liquid of a coolant system. In a first embodiment, the device has a body with a first end and a second opposed end. The device further has a swirl pot at the first end having a first fluid inlet for receiving fluid containing air of a first concentration, a first fluid outlet for conveying fluid having air of a second concentration lower than the first concentration, and an air bubble outlet. The device also has a pump end wall formed with the body and connected to the first fluid outlet.

In a second embodiment of the device, the device has a body having a first end, a second opposed end, a top and an opposed bottom. A swirl pot at the first end having a first fluid inlet for receiving fluid containing air of a first concentration, a first fluid outlet for conveying fluid having air of a second concentration lower than the first concentration, and an air bubble outlet. A pump end wall is formed with the body and connected to the first fluid outlet. A pump is connected to the pump end wall and contains an impeller.

In a third embodiment of the device, the device has a body having a first end and a second opposed end. A swirl pot at the first end has a first fluid inlet for receiving fluid containing air of a first concentration, a first fluid outlet for conveying fluid having air of a second concentration lower than the first concentration, and an air bubble outlet. The device includes a pump end wall formed with the body and the first fluid outlet.

Other features and advantages of the invention will be apparent from the following specification taken in conjunction with the following Figures.

BRIEF DESCRIPTION OF THE DRAWINGS

To understand the present invention, it will now be described by way of example, with reference to the accompanying drawings in which.

DETAILED DESCRIPTION

Figure 1:
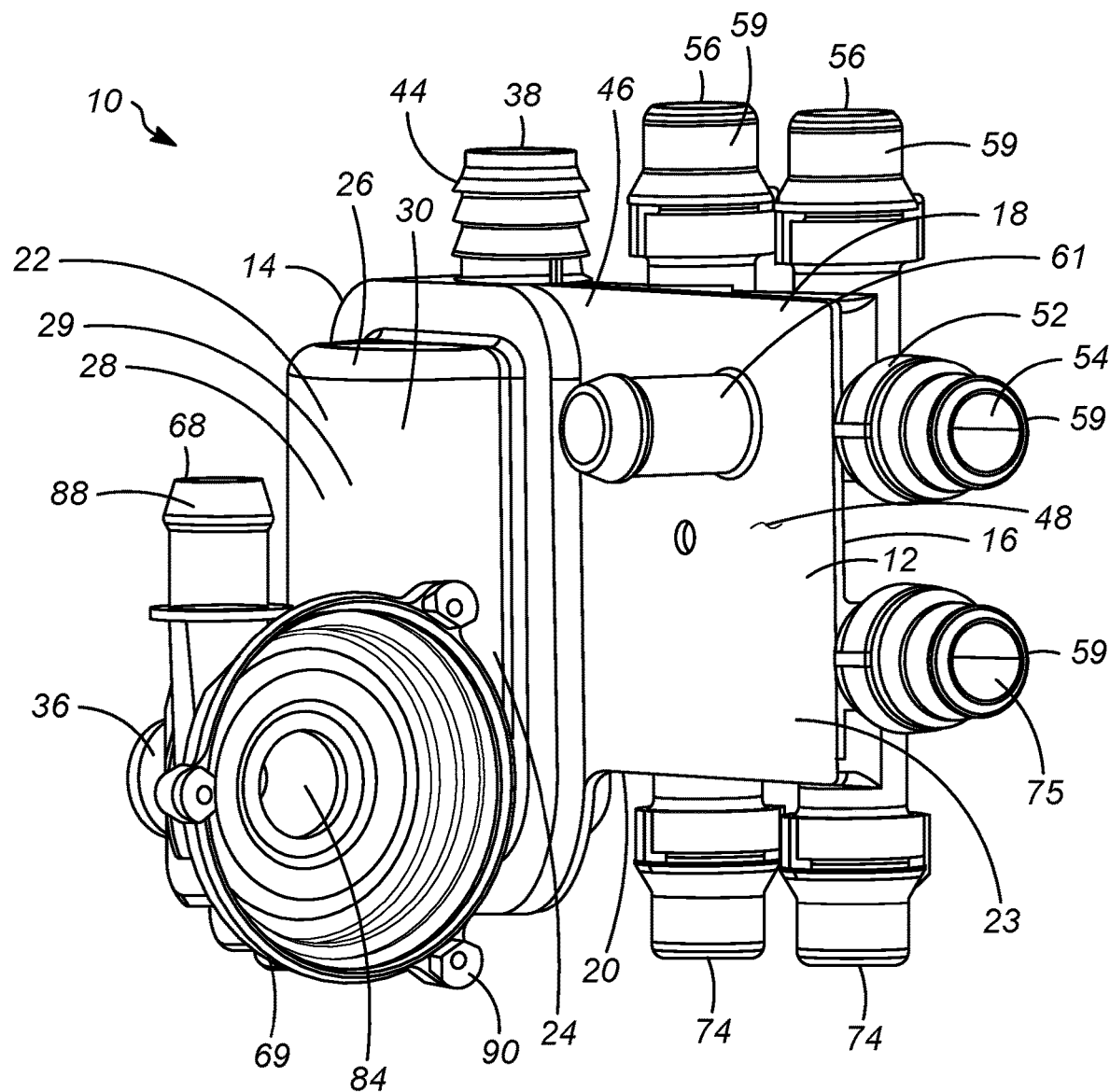
FIG. 1 is a perspective right end view of a combined deaerator and pump end wall device.

While this disclosure is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
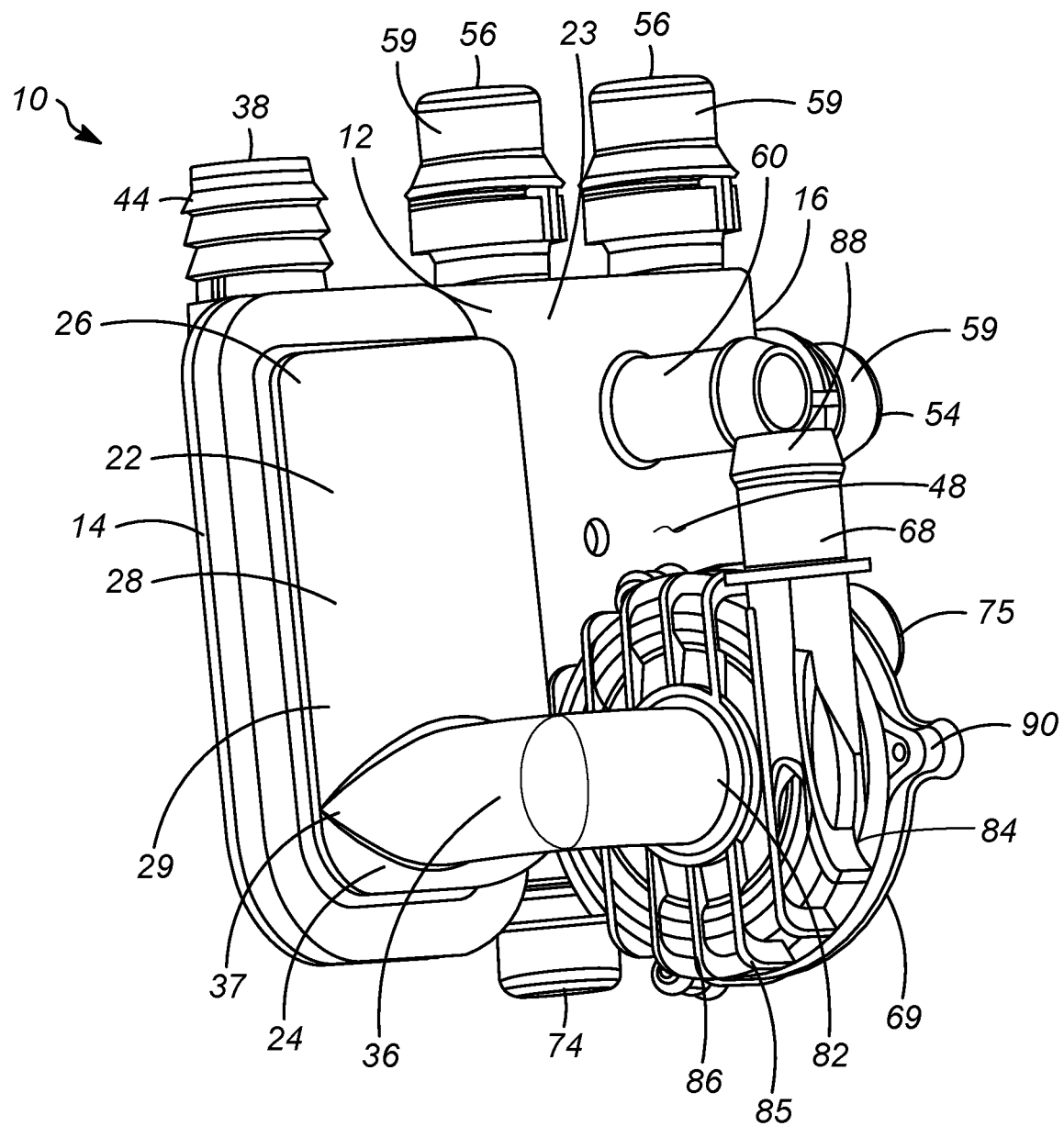
FIG. 2 is a perspective left end view of a combined deaerator and pump end wall device.
Figure 3:
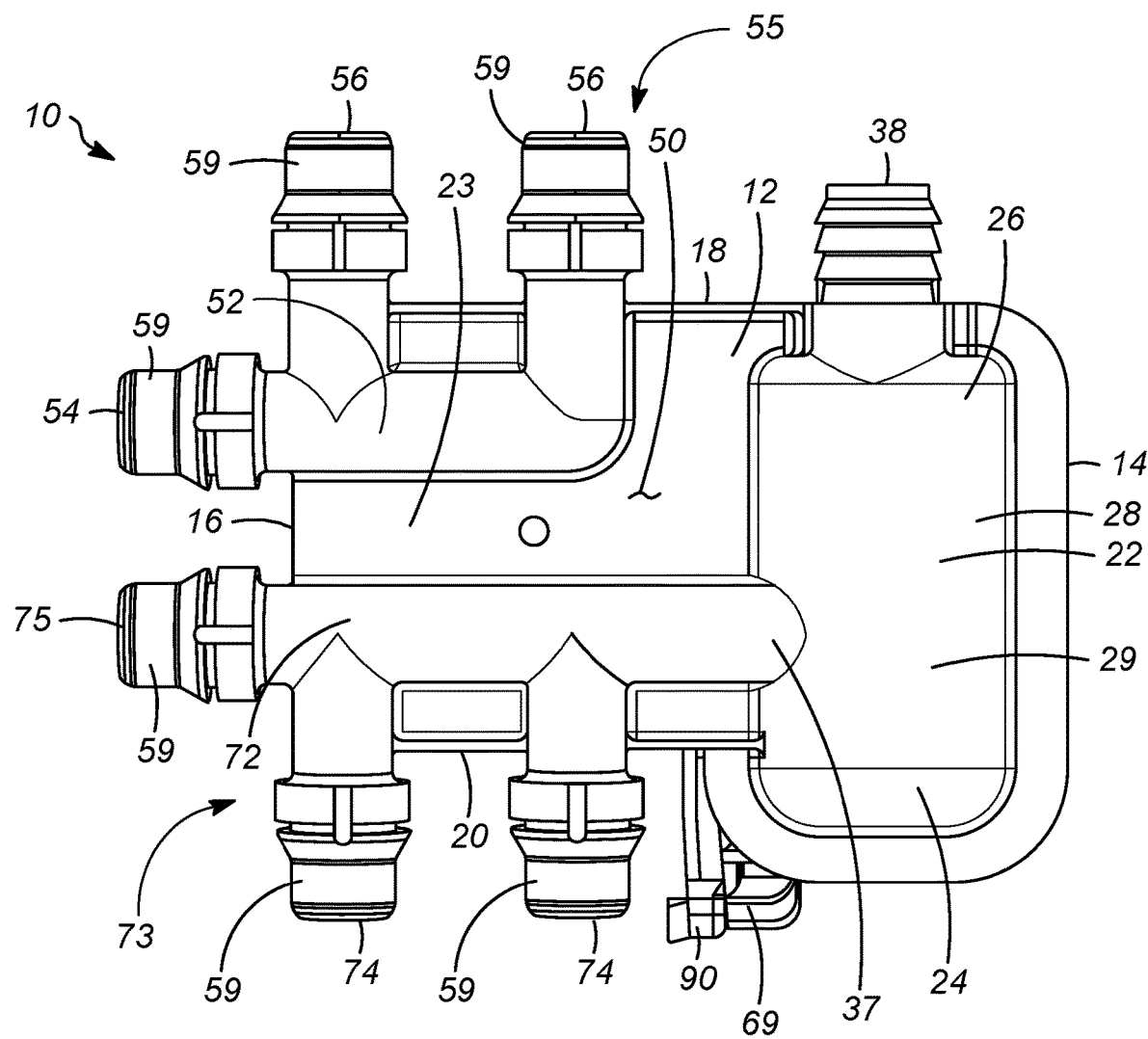
FIG. 3 is a perspective view of a back of a combined deaerator and pump end wall device.

FIGS. 1-3 show a combined deaerator and pump end wall device 10 in a body 12 having a first end 14, a second end 16 opposed to the first end, a top edge 18, and a bottom edge 20. The body 12 may have a unitary construction formed as a single part without need for assembly.

Turning to FIG. 1, a swirl pot 22 is at the first end 14 of the body 12. The body has a front surface 48. The swirl pot 22 has a bottom 24, a top 26, and a generally curved side wall 28 connecting the bottom 24 and the top 26 and defining an internal chamber 29. The side wall 28 has a front portion 30.

FIG. 2 shows the device 10 of FIG. 1 from a position left of the device. An air bubble outlet 38 extends through the top 26 and is for conveying air to a degas bottle (not shown). The degas bottle contains coolant fluid such as antifreeze and the air bubble outlet 38 may receive coolant fluid from the degas bottle to maintain proper coolant volume and pressure in a coolant system. A barbed connector 44 is positioned outside the chamber at the outlet 38 for connecting the air bubble outlet 38 to the degas bottle. A first fluid outlet pipe 36 extending from the side wall 28 near the bottom 24 is for conveying fluid having an air content of a second concentration lower than the first concentration away from the swirl pot 22. The first fluid outlet pipe 36 extends through a second opening 37 in the side wall 28 proximate the bottom 24 and terminates at a point between the first end 14 and the second end 16 of the body 12. The first fluid outlet pipe 36 is joined to a pump end wall 69. The pump end wall 69 is unitarily formed with the first fluid outlet pipe 36.

The pump end wall 69 is generally circular or domed and has a centrally disposed circular passageway therethrough comprising a fluid inlet 82 to the pump end wall and a peripheral edge 84. The first fluid outlet pipe 36 extends from the second opening 37 of the swirl pot 22 in a direction generally tangential to a curved portion of the side wall 28. A second fluid outlet pipe 68 is attached to an outer surface 85 of the pump end wall 69, extends tangentially to and from a peripheral edge 84 of the end wall 69 and terminates in a connector 88. The second fluid outlet pipe 68 is unitarily formed with the pump end wall 69. The outer surface 85 of a pump end wall 69 has vanes 86 standing up above the outer surface 85 for dissipating heat and extending perpendicular to the fluid inlet 82 from a top to a bottom of the circular wall and spaced from one another. The pump end wall 69 further has three, circumferentially spaced threaded bosses 90 for connecting to a pump. While three threaded bosses are shown a different number of bosses could be used without departing from the present disclosure.

FIG. 3 shows a view of a back of the device 10 revealing a rear portion 50 of the body 12. A manifold 23 extends from the swirl pot 22 toward the second end 16. The manifold 23 is on an opposite side of the body as the pump end wall 69. The manifold 23 comprises an outlet manifold 55 having a horizontally disposed outlet pipe 52 connected to two vertically disposed outlet pipes 56 and having an outlet 54 terminating in a quick connect fitment 59. The outlet pipes 52 and 56 can be connected to a heat dissipation device such as a heat exchanger to cool the coolant fluid. While a single horizontal outlet pipe 52 is shown, the number of such pipes can vary from 1-5 outlet pipes 52. Similarly, while two vertical outlet pipes 54 are shown, this number could vary based on the needs of a coolant system, from 1 to 10 vertical outlet pipes 56, more preferably from 2 to 8, even more preferably from 2 to 6, and most preferably 2 to 3.

The manifold 23 also comprises an inlet manifold 73. The inlet manifold 73 also has a horizontally disposed inlet pipe 72 having an inlet 75. The horizontal inlet pipe 72 is in fluid communication with two vertical inlet pipes 74. The inlet pipes 72 and 74 are in fluid communication with the internal chamber 29 of the swirl pot 22. While a single horizontal inlet pipe 72 is shown, the number of such pipes can vary from 1-5 inlet pipes 72. Similarly, while two vertical inlet pipes 74 are shown, this number could vary based on the needs of a coolant system. It is contemplated using from 1 to 10 vertical inlet pipes 74, more preferably from 2 to 8, even more preferably from 2 to 6, and most preferably 2 to 3. The number of horizontal outlet pipes 52 can be the same or different from the number of horizontal inlet pipes 72. Also, the number of vertical outlet pipes 56 and the number of vertical inlet pipes 74 can be the same number or a different number within these ranges. Preferably, the number of pipes in the inlet manifold 73 is the same as the number of pipes in the outlet manifold 55.

Figure 4:
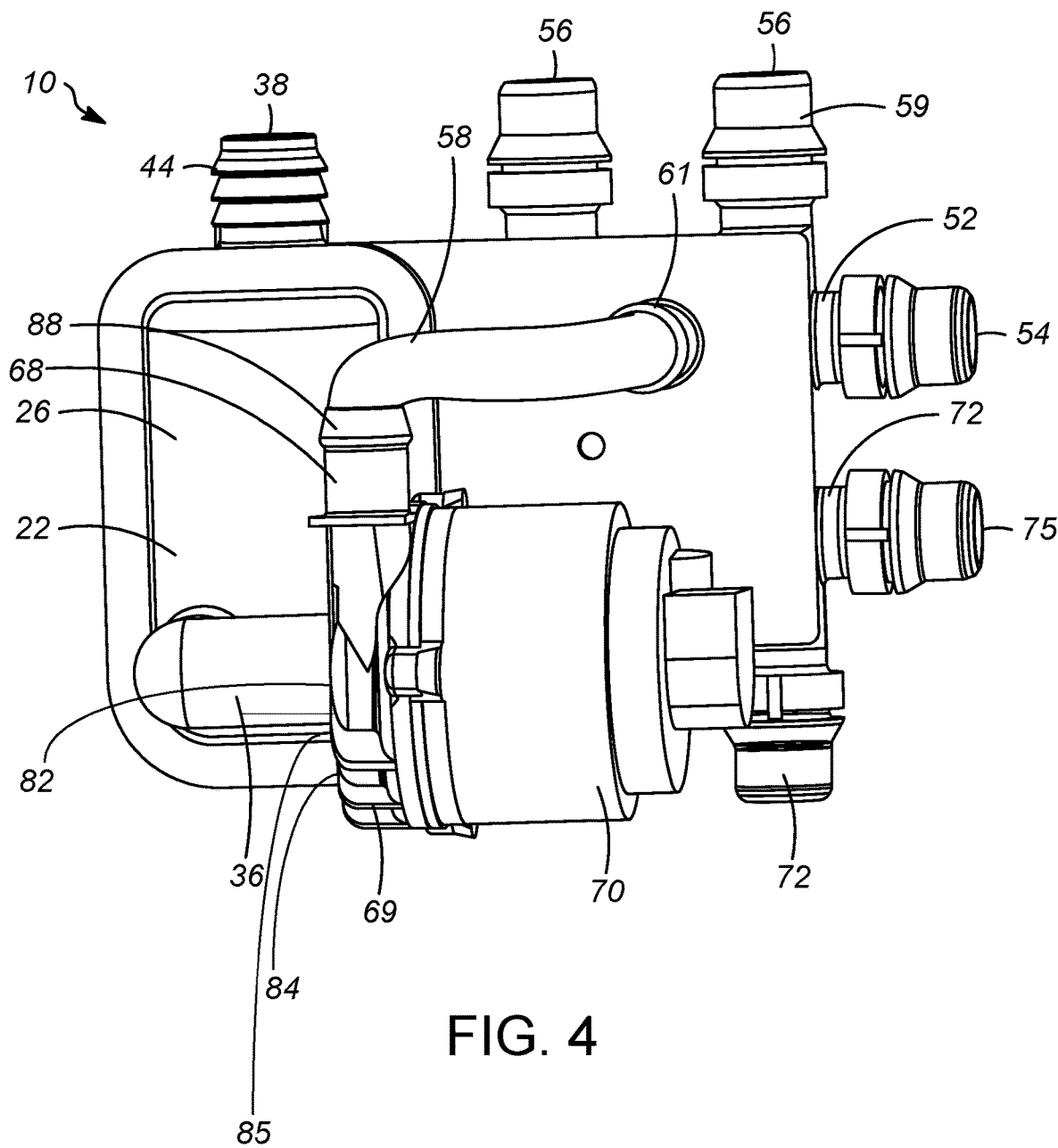
FIG. 4 is a perspective view of a front of a combined deaerator and pump end with a pump housing and a jumper pipe shown.

FIG. 4 shows the device 10 has a pump end wall 69 integrated with the swirl pot 22 preferably unitarily. The pump end wall 69 is mated to a pump 70. The pump end wall 69 encloses a pump impeller and provides one or more outlets for the pump 70. The pump transfers fluid under pressure from the swirl pot 22 through the first fluid outlet pipe 36 to a manifold inlet 61 which extends through the body 12 to the horizontal fluid pipe 52 of the outlet manifold 55 via a jumper pipe 58. The jumper pipe 58 is external to the body 12 and has a distal end connected to the manifold inlet 61 and a proximal end connected to a second fluid outlet pipe 68 of the pump end wall 69. The second fluid outlet pipe 68 is attached to an outer surface 85 of the pump end wall 69 and terminates in a connector 88 that may be secured by a hose clamp (not shown). The second fluid outlet pipe 68 is connected by the fluid jumper pipe 58 to the fluid passageway 54 as described above. The second fluid outlet pipe 68 also extends transversely to the first fluid outlet pipe 36. As shown the second fluid outlet pipe 68 is oriented about 90° to the first fluid outlet pipe 36, but it could be disposed at a different angle from 0° to 150°, more preferably from 30° to 120°, even more preferably from 45° to 90°, and most preferably 90°. The term "transverse" is meant to refer to angles from 1° to 150°.

In operation, deaerated fluid from the swirl pot 22 travels through the first fluid outlet pipe 36 into the fluid inlet 82 and enters the pump end wall 69. Inside the pump end wall 69, the fluid encounters a rotating impeller and is centrifugally impelled through the pump outlet pipe 68 through the jumper pipe 58 and the manifold inlet 61 into the outlet manifold 55 which distributes the fluid through the horizontal pipe 52 and the vertical pipes 56.

The body 12 can be made unitarily of any suitable material including plastics, metals, and composite materials. Suitable plastics include thermoplastics and thermosetting polymers. Suitable plastics include polyolefins, polyesters, polyamides, polyethers, polysulfones, polyetheramides, polyurethanes, polystyrenes, or others well known to those skilled in the art. The plastics can be homopolymers, copolymers, terpolymers, and block copolymers. Most preferably the plastic is glass filled nylon 6,6 (PA66), or a glass filled polypropylene (PP) or an unfilled PP. The unitary body can be formed by injection molding, plastic welding techniques, thermoforming or other technique well known to those of ordinary skill in the art. Suitable metals include aluminum, iron, steel, brass, copper, tin, and alloys thereof. The metals can be formed into the body using casting, forging or other techniques well known to those of skill in the art.

The fluid or cooling fluid or cooling liquid comprises, in one embodiment, ethylene glycol, water, or mixtures of the two.

Heat generating components includes, for example, an internal combustion engine, a battery for an electric vehicle, a lithium-ion battery, a battery charger, a DC/DC converter, and AC/DC converter, and other such components well known to those of ordinary skill in the art.

Many modifications and variations of the present invention are possible in light of the above teachings. It is, therefore, to be understood within the scope of the appended claims the invention may be protected otherwise than as specifically described. The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "vessel," or "system," within a claim is understood and intended to refer to structures known to those skilled in the relevant art, as further modified or enhanced by the features of the claims themselves, and is not intended to invoke 35 U. S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A device for removing air from a coolant liquid of a coolant system comprising:
   a body having a first end and a second opposed end;
   a swirl pot at the first end having a first fluid inlet for receiving fluid containing air of a first concentration, a first fluid outlet for conveying fluid having air of a second concentration lower than the first concentration, and an air bubble outlet; and,
   a pump end wall formed with the body and connected to the first fluid outlet.

2. The device of claim 1 wherein the pump end wall has a pump inlet in fluid communication with the first fluid outlet and a second fluid outlet.

3. The device of claim 2 wherein the second fluid outlet extends transversely to the first fluid outlet.

4. The device of claim 3 wherein the second fluid outlet terminates in a connector.

5. The device of claim 4 wherein the second fluid outlet extends from a peripheral edge of the pump end wall.

6. The device of claim 1 wherein the pump end wall has an outer surface having a plurality of heat vanes.

7. The device of claim 6 wherein the pump end wall is generally circular.

8. The device of claim 7 wherein the vanes extend from a top to a bottom of the circular wall.

9. The device of claim 1 further comprising a jumper fluid pipe communicating the first fluid outlet with an inlet manifold of the body.

10. A device for removing air from a coolant liquid of a coolant system comprising:
    a body having a first end, a second opposed end, a top and an opposed bottom;
    a swirl pot at the first end having a first fluid inlet for receiving fluid containing air of a first concentration, a first fluid outlet for conveying fluid having air of a second concentration lower than the first concentration, and an air bubble outlet;
    a pump end wall is formed with the body and connected to the first fluid outlet; and,
    a pump connected to the pump end wall and containing an impeller.

11. The device of claim 10 wherein the body is a unitary body.

12. The device of claim 11 wherein the body is a glass filled PA66, a glass filled PP or an unfilled PP.

13. The device of claim 10 wherein the pump end wall has a pump inlet in fluid communication with the first fluid outlet and a second fluid outlet.

14. The device of claim 13 wherein the second fluid outlet extends transversely to the first fluid outlet.

15. The device of claim 14 wherein the second fluid outlet is connected to a periphery of the circular wall.

16. A device for removing air from a coolant liquid of a coolant system comprising:
    a body having a first end and a second opposed end;
    a swirl pot at the first end having a first fluid inlet for receiving fluid containing air of a first concentration, a first fluid outlet for conveying fluid having air of a second concentration lower than the first concentration, and an air bubble outlet; and,
    a pump end wall formed with the body and the first fluid outlet.

17. The device of claim 1 wherein the pump end wall comprises a pump inlet in fluid communication with the first fluid outlet and a second fluid outlet.

18. The device of claim 1 further comprising a jumper fluid pipe communicating the first fluid outlet with a manifold of the body.

19. The device of claim 18 wherein the manifold is on an opposite side of the body as the end wall.

20. The system of claim 16 wherein the pump end wall is unitarily formed with the first fluid outlet and a second fluid outlet.

* * * * *